Feb. 24, 1931.  W. R. TURNBULL  1,793,652
AEROPLANE PROPELLER
Filed July 30, 1927
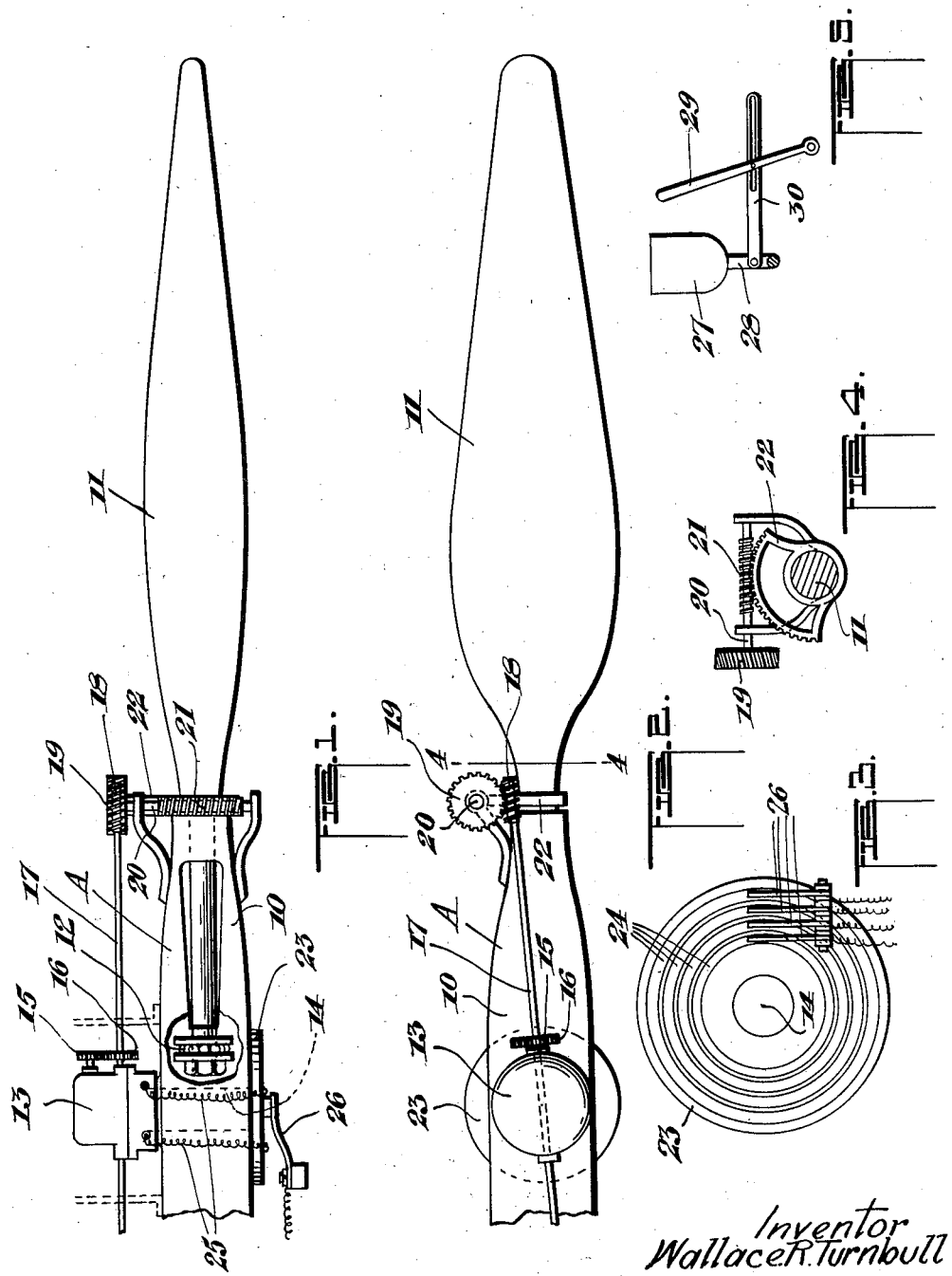
Inventor
Wallace R. Turnbull
BY Fetherstonhaugh & Co.
Att'ys Patented Feb. 24, 1931

1,793,652

UNITED STATES PATENT OFFICE

WALLACE RUPERT TURNBULL, OF ROTHESAY, NEW BRUNSWICK, CANADA

AEROPLANE PROPELLER

Application filed July 30, 1927. Serial No. 209,599.

This invention relates to variable pitch propellers for use in aeroplanes, airships, air propelled vehicles and aircraft generally.

The object of the invention generally is a variable pitch propeller for aircraft having an electric motor for altering the pitch of the blades incorporated therein in such manner as to enable the propeller unit to safely withstand the high speed operation and centrifugal and other forces encountered in aircraft operation and, moreover, a propeller wherein the pitch altering mechanism is unaffected by the type or character of the power plant employed and the alteration of the pitch may be effected with certainty under all conditions. A further object is a combined propeller and electric motor unit characterized by its compactness and lightness in weight and the facility with which the electric motor may be geared down to the adjustable pitch blades.

For a better understanding of the invention reference may be had to the accompanying drawings wherein:—

Figure 1 is a side elevation of the hub and one blade.

Figure 2 is a plan view of same.

Figure 3 is a rear elevation of the collector rings.

Figure 4 is a section through the line 4—4 of Figure 2 showing the worm wheel and worm.

Figure 5 is a side elevation of the control switch and engine throttle.

Referring more particularly to the drawings in which an example of my invention is disclosed, A designates the improved propeller as a whole comprising the hub 10 and blades 11 provided with a ball thrust washer 12 to counteract the centrifugal force of the blades and at the same time permitting rotation of the blade about its radial axis, the outer ends of the hub sockets 10 forming or having bearings in which the blades 11 are journalled.

The controlling mechanism by which the pitch of the blade or the blade angle can be adjusted at the will of the operator includes an electric motor unit 13 which is mounted on the face of the propeller hub across the outer end of main drive shaft 14, the motor unit being symmetrically disposed across and about the axis of the drive shaft and forming in effect a rigid part of the propeller unit. The motor shaft, is, therefore, disposed at an angle to the axis of the drive shaft and in the particular embodiment shown the motor unit consists of a single electric motor with the axis of the shaft disposed at right angles to and passing through the axis of the drive shaft. Any suitable gearing may be disposed between the motor unit 13 and the variable pitch blades 11. In the particular embodiment shown in Figs. 1 and 2 this gearing consists of a spur gear 15 meshing with a gear 16 on a rotatable spindle 17 on which is a worm 18 designed to mesh with a worm wheel 19 on a spindle 20 having a worm 21 thereon designed to mesh with a segmental worm wheel 22 rigidly attached to the shank or inner end of the blade 11 so that when the motor 13 is operated the spindle 17 will be rotated through the gears 15 and 16 and will in turn through the worm 18 meshing with the worm wheel 19 operate the worm 21 on the spindle 20, in turn meshing with the worm wheel 22, to rotate the blade 11. As indicated in Fig. 2 the shaft 17 extends across to the other side of the drive shaft 14 and meshes with similar gearing for operating the other blade 11.

The numeral 23 (see Figure 3) designates an insulating disc with metal collector rings 24 attached to the motor 13 by wires 25 and brushes 26 whereby a current is conveyed from any suitable source such as a battery or generator (not shown) and controlled by a switch 27 (see Figure 5).

To adjust or change the angles of the propeller blades the switch 27 is reversible and is operated while the battery, or generator may be arranged in any suitable position. The electric current will then pass through the brushes 26 to the motor 13 which in turn rotates the propeller blades 11 about their radial axes through the reduction gearing as previously described, to any desired angle. The operator can thus increase, decrease or reverse the pitch of the propeller at will. To reverse the pitch the operator may use any form or reverse switch and battery or generator placed in any suitable position.

From the foregoing it will be seen that the drive shaft 14 and the propeller blades 11 operate in the usual manner to propel the craft through the air and when it is desired to alter the pitch of the blade to suit the conditions of flying it is only necessary to operate through the reversing switch 27 the motor 13 which in turn will regulate, through the reduction gearing, the angle of the blades to any required angle. The construction set forth herein has demonstrated in practice its ability to withstand the high rotative speeds and centrifugal and other forces encountered in aircraft operation. It is characterized by its good balance and its lightness in weight and the motor is unaffected by the power plant operation.

While in Figure 3 four brushes or leads are shown it should be noted that three will suffice for the electric motor since one terminal may be grounded through the motor.

In Figure 5 a control switch and engine throttle is disclosed. This may be used to prevent racing the engine when the pitch of the blades is reduced and comprises an arm 28 for the switch 27 connected to the engine throttle 29 through a slotted bar 30 so that when the pitch of the blades is reduced by the control lever being thrown in, the slotted bar 30 will partially close the engine throttle. When the control lever is used to advance the pitch of the blades, or otherwise, the throttle will not be affected.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:—

1. A variable pitch propeller or air screw with blades rotatable about their radial axes, a main drive shaft, an electric motor on said shaft the armature shaft of which is at right angles to the main drive shaft, a rotatable spindle formed with a gear, a spur gear for the motor meshing with the spindle gear, a worm on the spindle remote from the gear, a second spindle at right angles to the aforementioned spindle and provided with a worm wheel meshing with the worm on the first-mentioned spindle, a segmental worm wheel rigidly connected to the propeller blades and designed to mesh with the worm on the second-mentioned spindle whereby, on the motor being operated, the first spindle is rotated to in turn operate the second spindle to rotate the propeller blades, an insulating disc, collector rings for said disc wire connected to the motor, and a device for controlling the supply of current thereto.

2. An aircraft propeller with variable pitch blades having an electric motor secured onto the face of the propeller hub to form a rigid part thereof and disposed symmetrically about the drive shaft axis, the axis of the electric motor shaft being disposed at right angles to and passing through the axis of the drive shaft, and reduction gearing between the electric motor and the variable pitch propeller blades.

3. An aircraft propeller with variable pitch blades having an electric motor unit mounted symmetrically across the outer end of the drive shaft and against the face of the propeller hub with the motor shaft extending across to opposite sides of the axis of the drive shaft and reduction gearing disposed between the electric motor shaft and the variable pitch propeller blades.

4. A propeller of the character set forth in claim 3 wherein the reduction gearing includes a transmission shaft extending outside the hub and substantially parallel with a propeller blade to which it is geared.

5. An aircraft propeller including a central hub structure, variable pitch blades journalled within radial bearing sockets formed in said hub structure and having thrust bearings capable of taking up the high centrifugal forces upon the blades encountered in aircraft operation, an electric motor unit mounted symmetrically across the outer end of the drive shaft and forming a rigid part of the propeller hub with the motor shaft extending across to opposite sides of the axis of the drive shaft and reduction gearing disposed between the electric motor unit and the variable pitch propeller blades.

6. In an aircraft propeller, a central hub structure, variable pitch blades journalled within radial bearing sockets formed in said hub and having thrust bearings capable of taking up the high centrifugal forces upon the blades encountered in aircraft operation, an electric motor unit mounted exteriorly of the hub structure but secured thereto to form a rigid unit therewith and disposed symmetrically about and upon the axis of revolution of the propeller and reduction gearing disposed between the electric motor unit and the variable pitch propeller blades which is also mounted exteriorly of the hub structure together with gear elements carried by the blade shanks.

7. In a propeller of the character set forth in claim 6 wherein the reduction gearing includes worm shafts passing through the plane of rotation of the propeller blades and meshing with the gear elements on the blade shank.

In witness whereof I have hereunto set my hand.

WALLACE RUPERT TURNBULL.